(12) United States Patent
Ishiguro

(10) Patent No.: US 10,136,013 B2
(45) Date of Patent: Nov. 20, 2018

(54) DOCUMENT READING DEVICE, IMAGE PROCESSING DEVICE, DOCUMENT READING METHOD AND RECORDING MEDIUM

(71) Applicant: Konica Minolta, Inc., Tokyo (JP)

(72) Inventor: Kazuhiro Ishiguro, Aichi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/454,030

(22) Filed: Mar. 9, 2017

(65) Prior Publication Data
US 2017/0264764 A1 Sep. 14, 2017

(30) Foreign Application Priority Data
Mar. 11, 2016 (JP) .................. 2016-048587

(51) Int. Cl.
*H04N 1/04* (2006.01)
*H04N 1/00* (2006.01)
*H04N 1/387* (2006.01)
*H04N 1/407* (2006.01)

(52) U.S. Cl.
CPC ....... *H04N 1/00806* (2013.01); *H04N 1/0032* (2013.01); *H04N 1/00718* (2013.01); *H04N 1/0435* (2013.01); *H04N 1/0464* (2013.01); *H04N 1/3878* (2013.01); *H04N 1/4076* (2013.01); *H04N 2201/0081* (2013.01); *H04N 2201/0094* (2013.01)

(58) Field of Classification Search
CPC ............ H04N 1/00806; H04N 1/0032; H04N 1/00718; H04N 1/0435
USPC ............................................. 358/1.13, 1.14
See application file for complete search history.

(56) References Cited

U.S. PATENT DOCUMENTS

2014/0072351 A1* 3/2014 Nishina ............. G03G 15/0189
399/301

FOREIGN PATENT DOCUMENTS

| JP | 2008-245209 | * 10/2008 | ............... H04N 1/04 |
| JP | 2013-110505 A | 6/2013 | |

* cited by examiner

*Primary Examiner* — Houshang Safaipour
(74) *Attorney, Agent, or Firm* — Osha Liang LLP

(57) ABSTRACT

A document reading device includes: a conveying unit configured to convey a document; a background member having a mark for correcting an inclination of the document; a color reading unit configured to read an image of the document and to output color image data; a monochrome reading unit configured to read the image of the document and to output monochrome image data; a switching unit configured to switch between a first state and a second state; and a hardware processor configured to switch into the first state at the time of a color mode, and to switch into the second state at the time of the monochrome mode, configured to detect the inclination of the document, and configured to correct the inclination of the color image data, and to correct the inclination of the monochrome image data, in accordance with the detected inclination of the document.

16 Claims, 6 Drawing Sheets

DOCUMENT READING DEVICE, IMAGE PROCESSING DEVICE, DOCUMENT READING METHOD AND RECORDING MEDIUM

The entire disclosure of Japanese Patent Application No. 2016-048587 filed on Mar. 11, 2016 including description, claims, drawings, and abstract are incorporated herein by reference in its entirety.

BACKGROUND OF THE INVENTION

Field of the Invention

The present invention relates to a document reading device which reads an image of a document to be conveyed, an image processing device equipped with the document reading device, a document reading method, and a document reading program.

Description of the Related Art

When a document is fed by an automatic document conveying device and is read by a reading device, an inclination (also referred to as skew) occurs with respect to an ideal reading position, due to an inclination at the time of setting the document or a mechanical conveyance accuracy.

As a method of correcting the skew, a method of physically correcting the skew by causing a document to abut against resist rollers has been conventionally known. In this method, however, because the document is made to abut against the resist rollers, a collision noise of the sheet occurs.

Therefore, in recent years, in order to reduce the noise, especially in a multifunctional digital image forming device called a multifunction peripheral (MFP) or the like, techniques of performing the skew correction in the image processing are being adopted. As one of them, there is a technique in which a background plate is disposed in a direction traversing the conveyance direction of the document on the background of the reading position, reflected light when the document passes through the background plate is received by a reading unit such as a CCD line sensor, and the inclination of the document is detected based on the image data output from the reading unit to correct the image data of the document in accordance with the detected inclination (for example, JP 2013-110505 A).

However, conventionally, when the skew correction is performed by the image processing, because the same sensor reads the background plate and the document image at the time of passage of the document for the skew correction, the following problems has occurred.

That is, when the skew correction is performed by the image processing, it is necessary to accurately detect a boundary (a leading end of the document) of the document from the image data that is output from the reading unit. However, if the background plate remains white, it is not possible to accurately perform gradation separation from shadow generated between the background plate and the documents. For this reason, although it is conceivable to hold a gradation in the background plate (for example, to make the ground plate black), there are problems such as an occurrence of ground fog or deterioration of set-off when the document is thin sheet. Furthermore, there are problems in image quality such as punched holes or ear folds in the document, or blackening of the margin when the size is irregular.

As a countermeasure to these problems, by providing a reflecting member of a mirror surface material on the background plate in an inclined manner to make a regular reflected light of the illumination light incident on the reading unit, the reading image of the document background is set to be equal to or higher than a reading upper limit (a saturation value) to secure contrast, and detection of presence or absence of document dependence is partially achieved.

However, although the aforementioned problems can be solved in this method, this method requires strict maintenance and management of the installation precision of the background plate (mirror), resulting in another problem of a significant increase in cost.

Incidentally, recently, in order to accurately reproduce colors for color images, while reading monochrome images at high speed, there is a tendency of increases in a document reading devices in which a monochrome reading unit including a Gy (gray) line sensor for reading a monochrome image is added to a color reading unit made up of three line sensors for R (red), G (green) and B (blue) for reading the color images.

Even in the document reading device having the color reading unit and the monochrome reading unit, when trying to detect and correct the inclination of the document by providing the background plate, because the same problems as the above-mentioned problem arise, the correspondence measures are required.

SUMMARY OF THE INVENTION

The present invention has been made in view of such a technical background, and an object thereof is to provide a document reading device having a color reading unit and a monochrome reading unit, which can detect an inclination at low cost, without affecting the image quality, an image processing device equipped with the document reading device, a document reading method, and a non-transitory recording medium storing a computer readable document reading program.

The above problems are solved by the following means.

To achieve the abovementioned object, according to an aspect, a document reading device reflecting one aspect of the present invention comprises: a conveying unit configured to convey a document; a background member provided in a direction traversing a conveyance direction of the document and having a mark for correcting an inclination of the document; a color reading unit configured to read an image of the document conveyed by the conveying unit and to output color image data; a monochrome reading unit configured to read the image of the document conveyed by the conveying unit and to output monochrome image data; a switching unit configured to switch between a first state in which the image of the document can be read by the color reading unit and a mark of the background member can be read by the monochrome reading unit, and a second state in which the image of the document can be read by the monochrome reading unit and the mark of the background member can be read by the color reading unit; and a hardware processor configured to switch into the first state by the switching unit at the time of a color mode to read the image of the document by the color reading unit and read the mark of the background member at the time of passage of the document by the monochrome reading unit, and to switch into the second state by the switching unit at the time of the monochrome mode to read the image of the document by the monochrome reading unit and read the mark of the background member at the time of passage of the document by the color reading unit, configured to detect the inclination of the document on the basis of the reading result of the mark of the background member at the time of passage of the document by the color reading unit or the monochrome reading unit, and configured to correct the inclination of the color image data output from the color reading unit at the time of the color mode, and to correct the inclination of the monochrome image data output from the monochrome reading unit at the time of the monochrome mode, in accordance with the detected inclination of the document.

To achieve the abovementioned object, according to an aspect, there is provided a document reading method executed in a document reading device comprising: a conveying unit configured to convey a document; a background member provided in a direction traversing a document conveyance direction and having a mark for correcting an inclination of the document; a color reading unit configured to read an image of the document conveyed by the conveying unit and to output color image data; and a monochrome reading unit configured to read the image of the document conveyed by the conveying unit and to output monochrome image data, and the method reflecting one aspect of the present invention comprises: a switching step of switching a first state in which the image of the document can be read by the color reading unit and a mark of the background member can be read by the monochrome reading unit, and a second state in which the image of the document can be read by the monochrome reading unit and the mark of the background member can be read by the color reading unit; a reading control step of switching into the first state by the switching step at the time of a color mode to read the image of the document by the color reading unit and read the mark of the background member at the time of passage of the document by the monochrome reading unit, and switching into the second state by the switching step at the time of the monochrome mode to read the image of the document by the monochrome reading unit and the mark of the background member at the time of passage of the document by the color reading unit; an inclination detecting step of detecting the inclination of the document on the basis of the reading result of the mark of the background member at the time of passage of the document by the color reading unit or the monochrome reading unit; and an inclination correcting step of correcting the inclination of the color image data output from the color reading unit at the time of the color mode, and correcting the inclination of the monochrome image data output from the monochrome reading unit at the time of the monochrome mode, in accordance with the inclination of the document detected by the inclination detection step.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the present invention is not limited to the illustrated examples.

Figure 1:
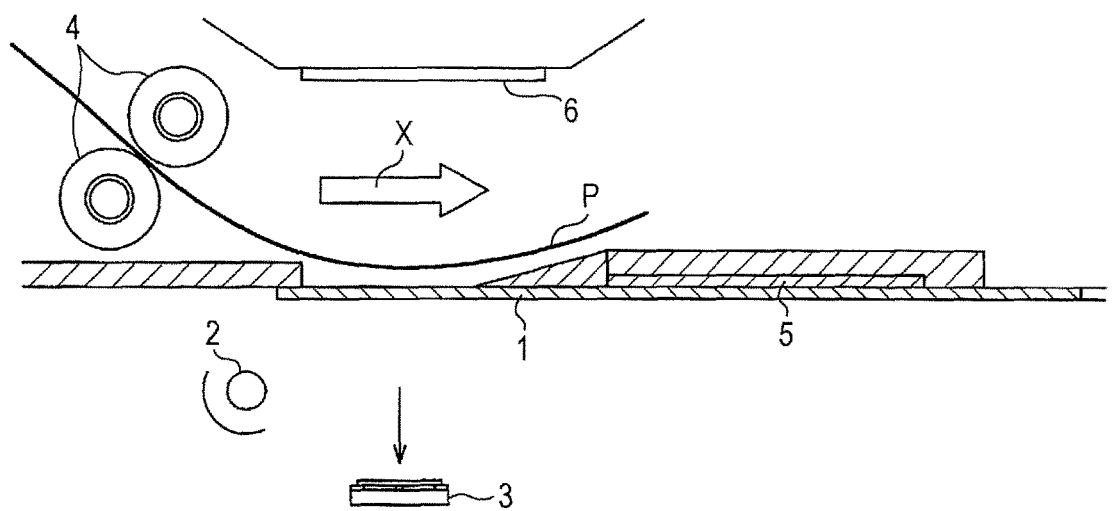
FIG. 1 is a cross-sectional view illustrating a mechanical schematic configuration of a document reading device mounted on an image processing device according to an embodiment of the present invention.

FIG. 1 is a cross-sectional view illustrating a mechanical schematic configuration of a document reading device mounted on an image processing device according to an embodiment of the present invention. Further, the document reading device may be mounted on another device other than the image processing device.

The document reading device is equipped with a light source 2 and a reading unit 3 below a document table glass 1, and conveys a document P in a direction indicated by an arrow X of FIG. 1 by a pair of document conveying rollers 4, thereby causing the document P to pass through a reading position on the document table glass 1. The light source 2 is disposed at a position where the document P passing over the document table glass 1 can be irradiated with light from an obliquely downward direction, and the reading unit 3 is disposed at a position where it is possible to receive the reflected light of light irradiated on the document P from the light source 2. Further, reference numeral 5 illustrated in FIG. 1 is a shading plate for performing a shading correction.

Above the document passage position of the document table glass 1, a background plate 6 is fixedly disposed in a manner of traversing the document conveyance direction X in a direction orthogonal to the document conveyance direction X with its lengthwise direction directed in a sheet thickness direction of FIG. 1.

Figure 2:
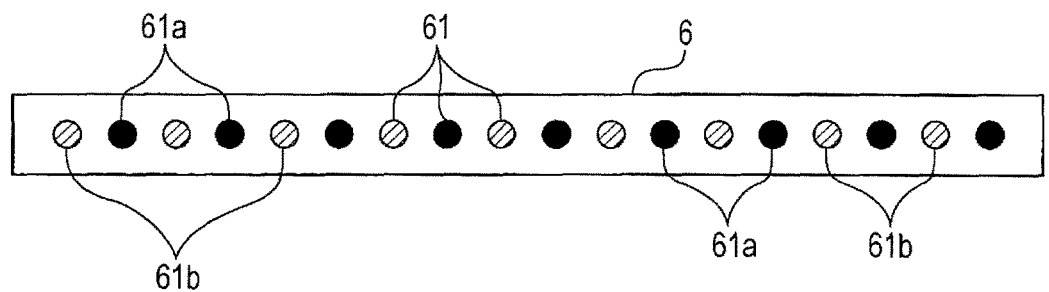
FIG. 2 is a plan view of a background member.

The background plate 6 is a member for detecting the inclination of the document P conveyed on the document table glass 1 with respect to the conveyance direction X. As illustrated in FIG. 2, marks 61 including a number of round dot patterns are formed along the lengthwise direction. In this embodiment, each mark 61 has a configuration in which a dark black mark 61a and a light black mark 61b (hatched) alternately exist, and even if the document is the same color as one of the dark black mark 61a or the light black mark 61b, it is possible to detect the inclination of the document P, using the mark of the other color.

Figure 3:
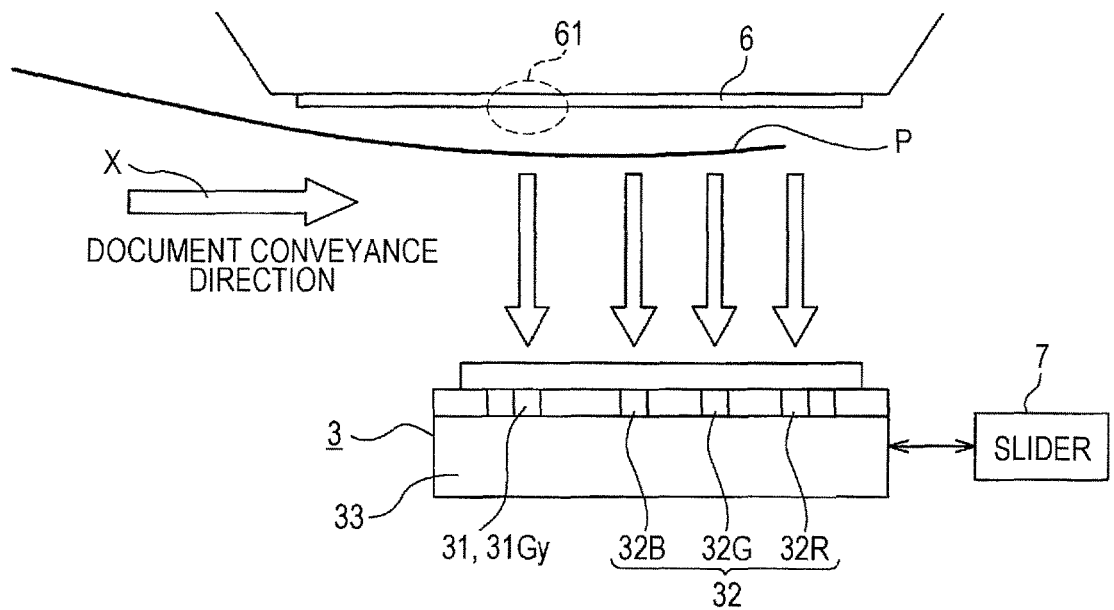
FIG. 3 is a diagram illustrating a configuration of a color reading unit and a monochrome reading unit, and a positional relation between each reading unit and a background member at the time of a color mode.

As illustrated in FIG. 3, in the reading unit 3, a color reading unit 32 which outputs color image data, and a monochrome reading unit 31 which outputs monochrome image data are integrally provided on a single base material 33. The color reading unit 32 is made up of three CCD line sensors 32B, 32G and 32R for R (red), G (green) and B (blue), and the monochrome reading unit 31 is made up of a single Gy (gray) CCD line sensor 31Gy. Each of the line sensors 32B, 32G, 32R and 31Gy receives reflected light of the light of the document P irradiated from the light source 2 and converts the reflected light into a voltage. Each of the line sensors is disposed in a manner of traversing the document conveyance direction X, with the lengthwise direction thereof set in a direction orthogonal to the document conveyance direction X toward the sheet thickness direction of FIG. 3, in the order of the Gy (gray) line sensor 31Gy, the B (blue) line sensor 32B, the G (green) line sensor 32G, and the R (red) line sensor 32R from upstream side in the document conveyance direction.

In this embodiment, furthermore, the reading unit 3 can move in the document conveyance direction X and its opposite direction (a left-right direction in FIG. 3) via a slider 7. The position to be moved is set in accordance with whether the reading mode is the color mode or the monochrome mode in advance as follows.

That is, in the case of the color mode, as illustrated in FIG. 3, the reading unit 3 is moved to a position (a first state) at which the image of the document P can be read by the color reading unit 32, and the mark 61 of the background plate 6 at the time of passage of the document can be read by the monochrome reading unit 31. Therefore, at this position, the image of the document can be read by the color reading unit 32 at a position deviated from the mark 61 of the background plate 6. Even when the document is thin sheet, there is no problem of the image quality such as an occurrence of ground fog or a deterioration of set-off caused by the mark 61 of the background plate 6, or blackening of a margin caused when there is a punch hole or an ear fold in the document or the size is irregular.

Figure 4:
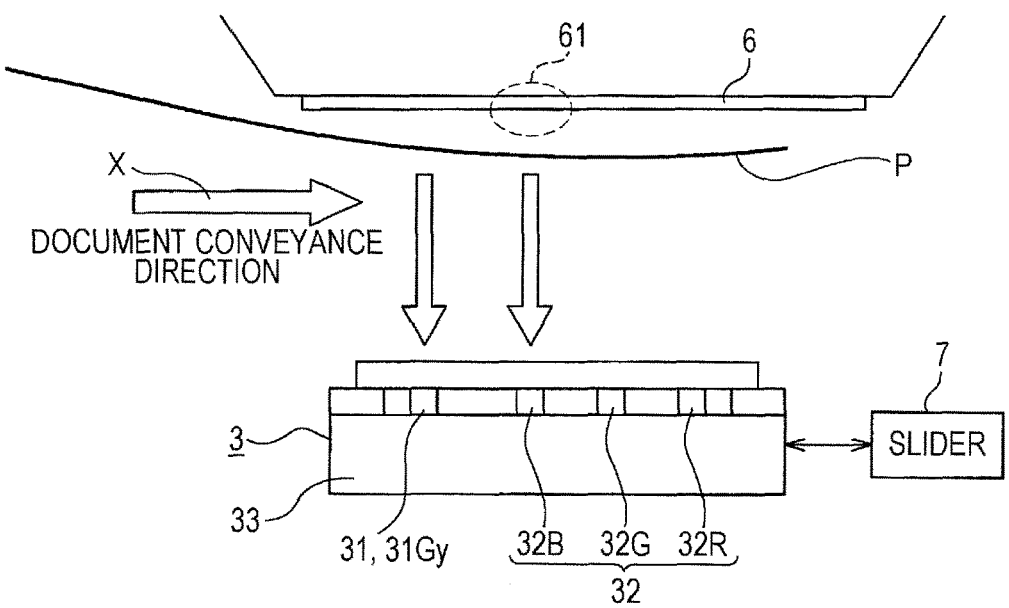
FIG. 4 is a diagram illustrating a configuration of a color reading unit and a monochrome reading unit, and a positional relation between each reading unit and a background member at the time of a monochrome mode.

On the other hand, in the case of the monochrome mode, as illustrated in FIG. 4, the reading unit 3 is moved by the slider 7 to a position (a second state) at which the image of the document P can be read by the monochrome reading unit 31, and the mark 61 of the background plate 6 at the time of passage of the document can be read by the B (blue) line sensor 32B of the color reading unit 32. At this position, the image of the document P can be read by the monochrome reading unit 31 at a position deviated from the mark 61 of the background plate 6, and even if the document P is a thin sheet, it is possible to read the document image, without receiving the effect of the mark 61 of the background plate 6.

Further, the mark 61 of the background plate 6 may be read by the G (green) line sensor 32G or the R (red) line sensor 32R of the color reading unit 32. However, it is preferable to read the mark 61 by the B (blue) line sensor 32B which is disposed at the position closest to the monochrome reading unit 31, since the subsequent processes are most simplified.

Figure 5A:
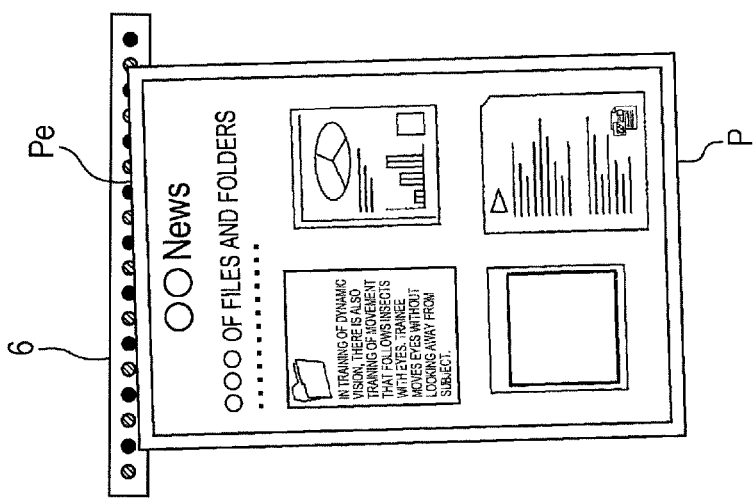
FIGS. 5A to 5C are diagrams illustrating a detection principle of an inclination of a document to be conveyed.
Figure 5B:
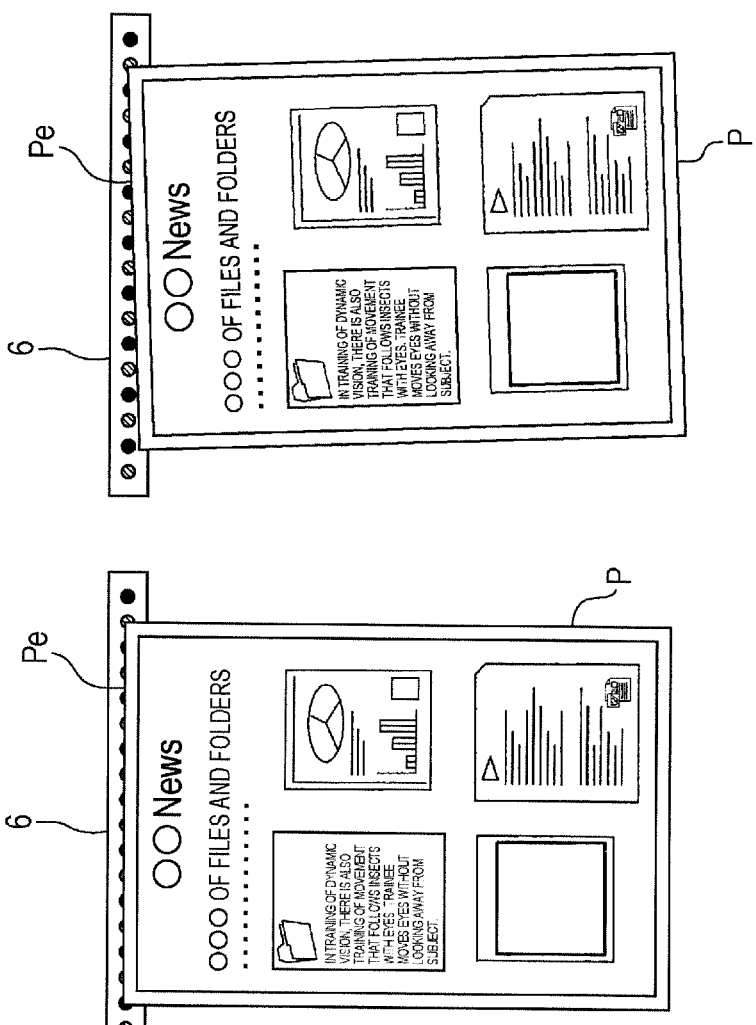
Figure 5C:
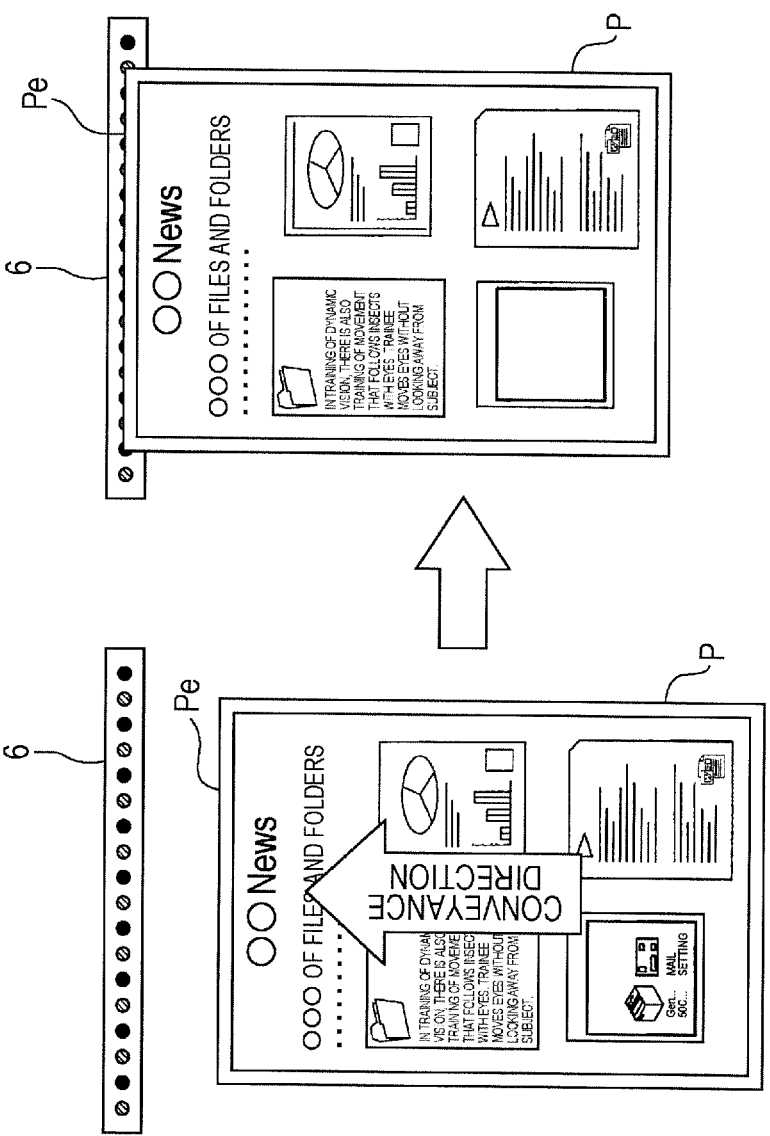

FIGS. 5A to 5C are diagrams illustrating the detection principle of the inclination of the document P to be conveyed. As illustrated in FIG. 5A, when a document is conveyed with no inclination with respect to the conveyance direction of the document P, as illustrated in FIG. 5B, because each mark 61 of the background plate 6 disappears simultaneously with a leading end Pe of the document P and the image data is obtained, it is determined that there is no inclination. When the document P is inclined, as illustrated in FIG. 5C, the mark 61 of the background plate 6 becomes the image data that disappears by being hidden behind the leading end Pe of the document P in order from the left side or the right side of the background plate 6 as viewed from the upstream side in the document conveyance direction. Accordingly, it is determined that there is an inclination. If the main scanning direction is set to 0 degree, when the document P disappears from the left side of the background plate 6 as viewed from the document conveyance direction, the document P is inclined in the negative direction, and when the background plate 6 disappears from the right side, the document P is determined to be inclined in the positive direction.

Figure 6:
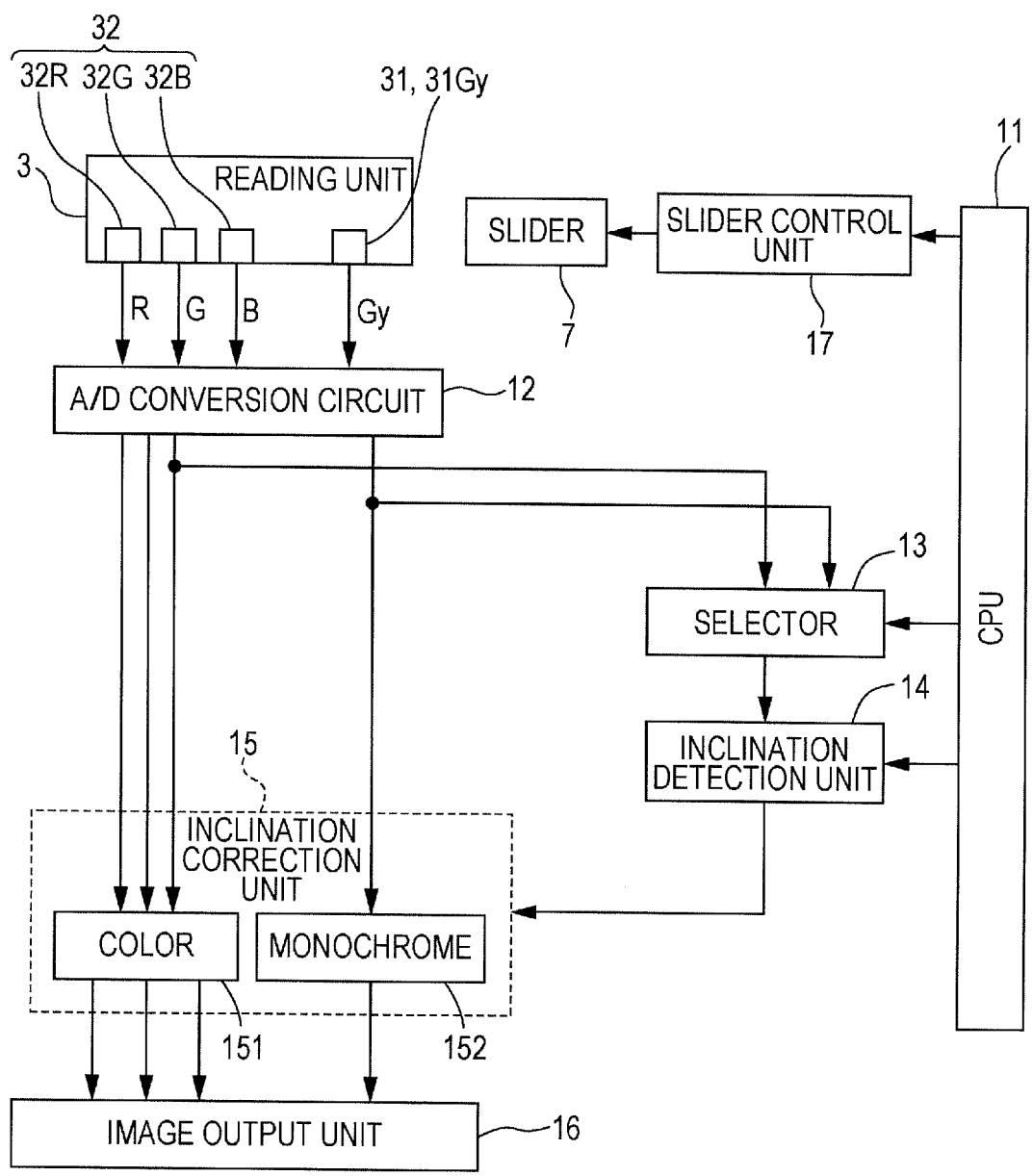
FIG. 6 is a block diagram illustrating an electrical configuration of the document reading device illustrated in FIG. 1.

FIG. 6 is a block diagram illustrating an electrical configuration of the document reading device illustrated in FIG. 1.

In addition to the total of four line sensors 31Gy, 32B, 32G and 32R and the slider 7 in the above-described reading unit 3, the document reading device includes a CPU 11, an A/D conversion circuit 12, a selector 13, an inclination detection unit 14, an inclination correction unit 15, an image output unit 16, a slider control unit 17 and the like.

The CPU 11 totally controls the overall document reading device, and executes processing by operating in accordance with operation programs stored in a storage unit such as a ROM (not illustrated) or a hard disk device (not illustrated).

The A/D conversion circuit 12 is a circuit that converts image data, which is an analog value output from each line sensor, into a digital value.

The selector 13 is controlled by the CPU 11 and plays a role of selecting the image data which is output from the line sensor that reads the mark 61 of the background plate 6, depending on whether the current reading setting is a color mode or a monochrome mode. Specifically, the image data from the Gy (gray) line sensor 31Gy is selected in the case of the color mode, and the image data from the B (blue) line sensor 32B is selected in the case of the monochrome mode.

The inclination detection unit 14 detects the edge of the document P from the read data of the mark 61 of the background plate 6 at the time of passage of the document, which is the image data selected by the selector 13, detects the inclination of the document P based on the determination criterion as described with reference to FIGS. 5A to 5C, and outputs the detection result to the inclination correction unit 15. In a case where the current reading setting is the color mode, the inclination is detected based on the image data from the Gy (gray) line sensor 31Gy, and in the case of the monochrome mode, the inclination is detected based on the image data from the B (blue) line sensor 32B.

The inclination correction unit 15 corrects the inclination of each image data subjected to A/D conversion by the A/D conversion circuit 12, depending on the inclination angle detected by the inclination detection unit 14, and includes a color inclination correction unit 151 which corrects color image data at the time of the color mode, and a monochrome inclination correction unit 152 which corrects the monochrome image data at the time of the monochrome mode. Further, since the method of correcting the image data depending on the inclination of the document P is well known, a detailed description thereof will not be provided.

The image output unit 16 is configured to output the image data with the inclination corrected by the inclination correction unit 15. For example, the image output unit 16 includes a printing unit that prints the image data on sheet, a transmission unit that transmits the image data to a destination which is set using an e-mail, and the like. The image output unit 16 is controlled by the CPU 11 so that data according to the current reading setting is output.

The slider control unit 17 controls the slider 7 in accordance with the command from the CPU 11, and moves the reading unit 3.

Figure 7:
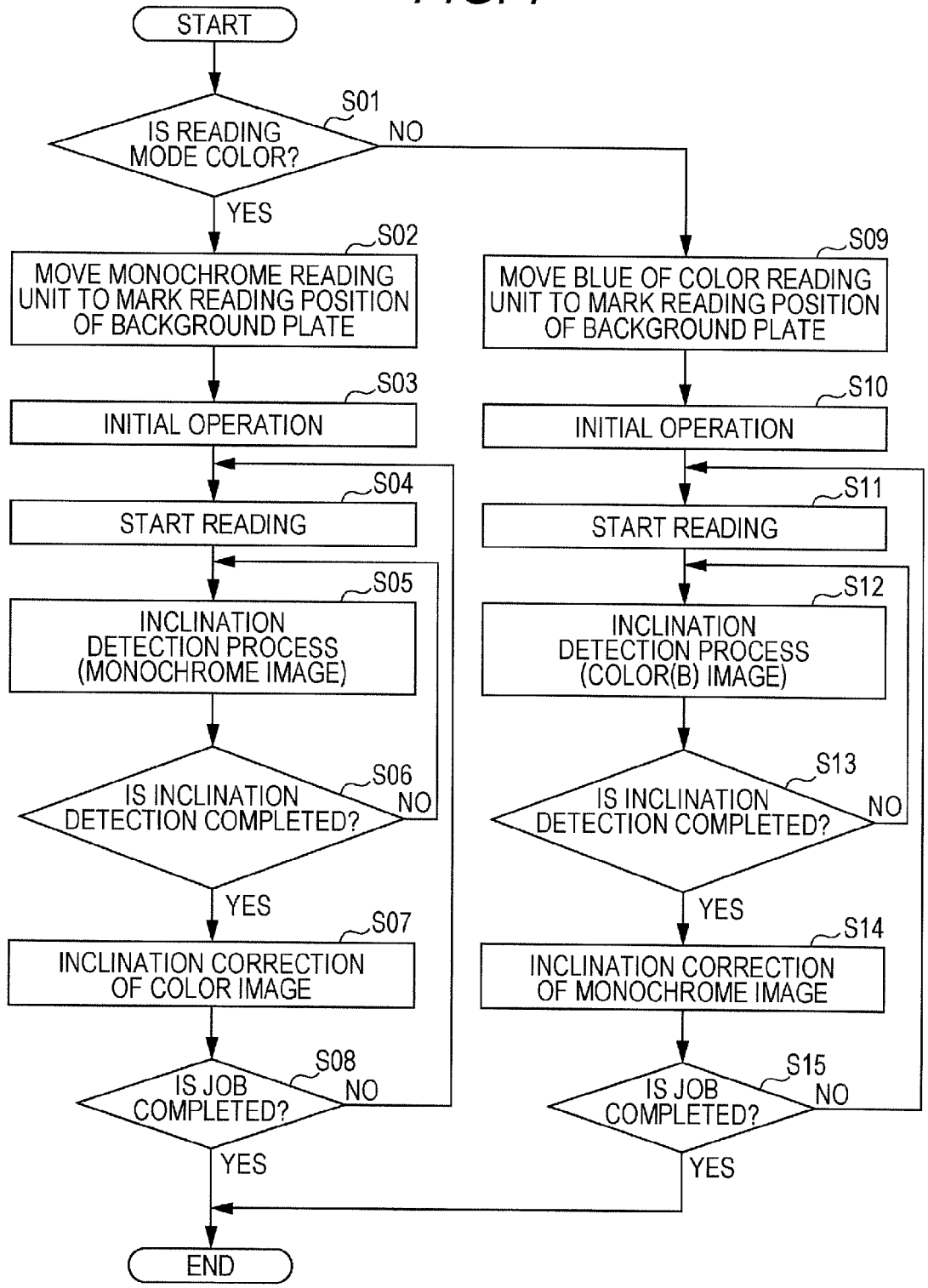
FIG. 7 is a flowchart illustrating a reading operation of the document reading device illustrated in FIG. 6.

FIG. 7 is a flowchart illustrating the reading operation of the document reading device illustrated in FIG. 6. The operation is executed by the CPU 11 which operates in accordance with to the operation program stored in the storage unit (not illustrated).

In step S01, it is determined whether or not the reading mode is a color mode. In the case of the color mode (YES in step S01), in step S02, the reading unit 3 is moved via the slider 7 such that the Gy (gray) line sensor 31Gy, which is the monochrome reading unit 31, comes to the reading position of the mark 61 of the background plate 6. In this state, the color reading unit 32 is disposed at a position where the image of the document P can be read.

Further, a function (an ACS function) for automatically discriminating whether the document P is a color document or a monochrome document is included, and when the function is enabled and the automatic discrimination mode is set, the reading mode is determined to be the color mode. In this case, a monochrome image is created using the color image data.

Next, the initial operation is executed in step S03. The initial operation is a basic operation that is necessary for reading such as a lamp light amount adjustment, a clamp adjustment, a gain adjustment, a shading correction and the like. Further, the initial operation to be executed depends on the required performance.

After completion of the initial operation, reading is started in step S04. The image of the document P is read by the color reading unit 32, and the mark 61 of the background plate 6 at the time of passage of the document is read by the monochrome reading unit 31.

Next, in step S05, the inclination of the document P is detected on the basis of the image data of the mark 61 of the background plate 6 that is read by the monochrome reading unit 31. It is determined whether or not the inclination detection process has been completed in step S06. If the inclination detection process is not completed (NO in step S06), the process returns to step S05 to continue the inclination detection process. When the inclination detection process is completed (YES in step S06), after the inclination of the color image data is corrected in accordance with the detected inclination of the document P in step S07, the process proceeds to step S08.

In step S08, it is checked whether the job is completed, in other words, whether there is a document of the next page. If the job is not completed (NO in step S08), the process returns to step S04, and the processes of S04 to S08 are executed on the document of the next page. If the job is completed (reading of all the documents is completed) (YES in step S08), the reading process is terminated.

When the reading mode is the monochrome mode (NO in step S01) in step S01, the process proceeds to step S09, and the reading unit 3 is moved via the slider 7 such that the B (blue) line sensor 32B of the color reading unit 32 comes to the reading position of the mark 61 of the background plate 6. In this state, the monochrome reading unit 31 is disposed at a position where the image of the document P can be read.

Next, after the initial operation prior to the start of reading is executed in step S10, reading is started in step S11. The image of the document P is read by the monochrome reading unit 31, and the mark 61 of the background plate 6 at the time of passage of the document is read by the color reading unit 32.

Next, in step S12, the inclination of the document P is detected on the basis of the image data of the mark 61 of the background plate 6 at the time of passage of the document, which is read by the color reading unit 32 (B (blue) line sensor 32B), and it is determined whether or not the inclination detection process has been completed in step S13. If the inclination detection process is not completed (NO in step S13), the process returns to step S12 to continue the inclination detection process. When the inclination detection process is completed (YES in step S13), after the inclination of the monochrome image data is corrected in accordance with the detected inclination of the document P in step S14, the process proceeds to step S15.

In step S15, it is checked whether or not the job is completed, in other words, whether or not there is a document of the next page. If the job is not completed (NO in step S15), the process returns to step S11, and the processes of S11 to S15 on the document of the next page are executed. When the job is completed (YES in step S15), the reading process is terminated.

Figure 8:
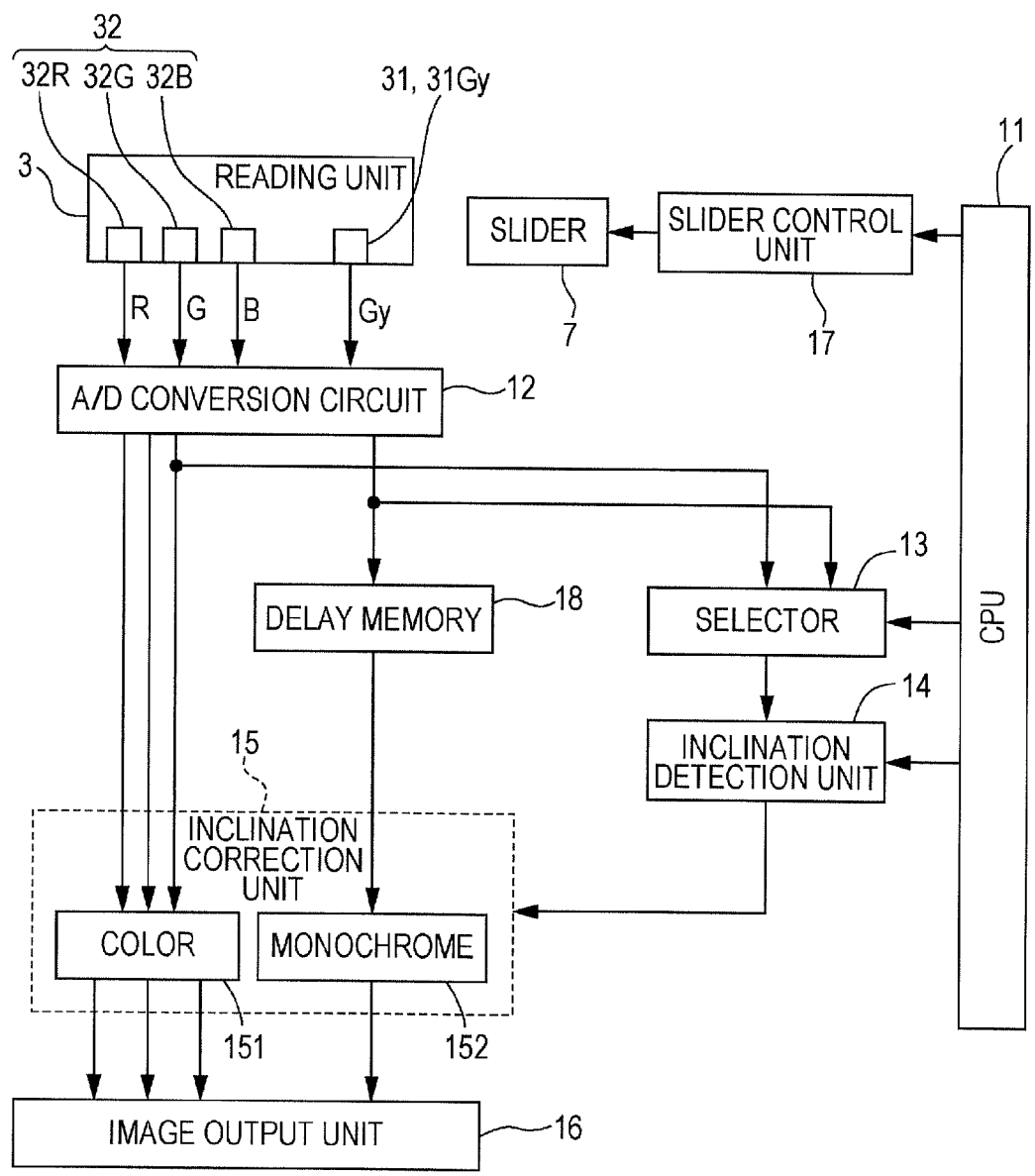
FIG. 8 is a block diagram illustrating an electrical configuration of a document reading device according to another embodiment of the present invention.

FIG. 8 is a block diagram illustrating an electrical configuration of a document reading device according to another embodiment of the present invention. In this embodiment, a delay memory 18 for delaying the output of the monochrome image data is provided between the A/D conversion circuit 12 and the monochrome inclination correction unit 152. Further, because the configuration is the same as that of the document reading device illustrated in FIG. 6 except that the delay memory 18 is provided, the same components are denoted by the same reference numerals and the description thereof will not be provided.

In this embodiment, the monochrome reading unit 31 is disposed on the upstream side of the color reading unit 32 in the document conveyance direction X. Therefore, at the time of the monochrome mode, after the monochrome reading unit 31 outputs the monochrome image data, the read image of the mark 61 of the background plate 6 at the time of passage of the document is output from the B (blue) line sensor 32B, with a delay of the interval between the Gy (gray) line sensor 31Gy of the monochrome reading unit 31 and the B (blue) line sensor 32B of the color reading unit 32. That is, since the monochrome image data is output from the monochrome reading unit 31 before the inclination detection is completed, regarding the monochrome image data which is output before the detection of the inclination by the inclination detection unit 14 is completed, there is a risk of difficulty in performing the inclination correction which reflects the inclination detection result.

Therefore, by delaying the monochrome image data which is output from the monochrome reading unit 31 by the delay memory 18 until the inclination is detected, complementation between the monochrome reading unit 31 and the B (blue) line sensor 32B is performed, such that a proper inclination correction can also be executed on the monochrome image data which is output from the monochrome reading unit 31 prior to the completion of the inclination detection. The size of the delay memory 18 is determined by the interval between the monochrome reading unit 31 and the B (blue) line sensor 32B.

Further, the operation of the document reading device illustrated in FIG. 8 is the same as the operation illustrated in the flowchart of FIG. 7, except that the inclination correction of the monochrome image data in step S14 in the flowchart of FIG. 7 is performed on the monochrome image data delayed by the delay memory.

For example, the configuration was provided in which background plate 6 is fixed and the reading unit 3 is movable, and it is possible to switch the position (the first state) at which the image of the document P can be read by the color reading unit 32 in the case of the color mode, and the mark 61 of the background plate 6 can be read by the monochrome reading unit 31, and the position (the second state) at which the image of the document P can be read by the monochrome reading unit 31 in the case of the monochrome mode, and the mark of the background plate can be read by the B (blue) line sensor 32B of the color reading unit 32. However, a configuration may be provided in which the position of the reading unit 3 is fixed and the background plate 6 is movable such that the first state and the second state may be switched, or both the background plate 6 and the reading unit 3 may also be movable to switch the first state and the second state by moving both of them.

While an example in which the color reading unit 32 and the monochrome reading unit 31 are integrally provided on a single base material 33 was illustrated, the color reading unit 32 and the monochrome reading unit 31 may be configured to be separated from each other, and the color reading unit 32 and the monochrome reading unit 31 may be configured to be independently movable by the slider 7.

Further, while a case where the monochrome reading unit 31 is disposed on the upstream side of the color reading unit 32 in the document conveyance direction was described, the color reading unit 32 may be disposed on the upstream side of the monochrome reading unit 31. However, when the color reading unit 32 is provided on the upstream side, if the image data from the color reading unit 32 is delayed with the delay memory, there is a need for a delay memory on each of the B (blue) line sensor 32B, the G (green) line sensor 32G and the R (red) line sensor 32R. Accordingly, it is preferable to dispose the monochrome reading unit 31 on the upstream side in view of capable of reducing the delay memory.

While a case where the monochrome reading unit 31 is constituted by a single (one line) Gy (gray) CCD line sensor 31Gy was illustrated, the monochrome reading unit 31 may be constituted by two (two lines) or more CCD line sensors.

According to Item. 1 of the invention, a switching unit is included which switches between a first state in which an image of a document can be read by a color reading unit and a mark of a background member can be read by a monochrome reading unit, and a second state in which the image of the document can be read by the monochrome reading unit and the mark of the background member can be read by the color reading unit. At the time of the color mode, switching to the first state is performed by the switching unit to read the image of the document by the color reading unit and to read the mark of the background member at the time of passage of the document by the monochrome reading unit. At the time of the monochrome mode, switching to the second state is performed to read the image of the document by the monochrome reading unit and to read the mark of the background member at the time of passage of the document by the color reading unit. Further, the inclination of the document is detected on the basis of the reading result of the mark of the background member at the time of passage of the document provided by the color reading unit or the monochrome reading unit, and in accordance with the detected inclination of the document, the inclination of the color image data output from the color reading unit is corrected at the time of the color mode, and the inclination of the monochrome image data output from the monochrome reading unit is corrected at the time of the monochrome mode.

That is, the monochrome reading unit is not used for reading the image of the document at the time of the color mode, and the color reading unit is not used for reading the image of the document at the time of the monochrome mode. Therefore, since the mark of the background member at the time of passage of the document is read using the unused reading unit, the mark of the background member does not affect the reading of the image of the document. Therefore, even when the document is a thin sheet, and even if the mark of the background member is black or the like, there is no problem of the image quality such as an occurrence of ground fog, deterioration of set-off, or blackening of a margin caused when there is a punch hole or an ear fold in the document or the size is irregular. Therefore, high image quality can be achieved. Moreover, there is no configuration in which the reading image on the back side of the document is set to be equal to or higher than the upper limit value (a saturation value), by causing the regular reflected light of the illumination light to be incident on the reading unit. Accordingly, there is no need to strictly maintain and manage the installation precision of the background plate (mirror), which does not cause an increase in cost. As a result, it is possible to provide a document reading device which can achieve the inclination detection at low cost, without affecting the image quality.

According to the preferred embodiment, the first state and the second state may be switched, by moving the color reading unit and the monochrome reading unit to different positions with respect to the background member, at the time of the color mode and at the time of the monochrome mode.

According to the preferred embodiment, the first state and the second state may be switched, by moving the background member to different positions with respect to the color reading unit and the monochrome reading unit, at the time of the color mode and at the time of the monochrome mode.

According to the preferred embodiment, since the monochrome reading unit is disposed on the upstream side of the color reading unit in the document conveyance direction, the mark of the background member at the time of passage of the document is read by the color reading unit to be later for reading of the image of the document by the monochrome reading unit, and at the same time, the inclination is detected and the monochrome image data is corrected. Therefore, in order to reflect the inclination correction on the image data which is output until the inclination is detected, there is a need for a delay memory which delays the monochrome image data output from the monochrome reading unit until the inclination of the document is detected. However, when the color reading unit is disposed on the upstream side of the monochrome reading unit in the document conveyance direction, there is a need for a delay memory for the three colors of R (red), G (green) and B (blue) colors that are output from the color reading unit. In contrast, by disposing the monochrome reading unit on the upstream side of the color reading unit in the document conveyance direction, only one color delay memory is needed, and the configuration is simplified.

According to the preferred embodiment, by holding and delaying the monochrome image data output from the monochrome reading unit in the delay memory at the time of the monochrome mode until the inclination of the document is detected, it is also possible to correct the inclination of the monochrome image data which is output until the inclination is detected.

According to the preferred embodiment, when the automatic discrimination mode of discriminating whether the document is a color document or a monochrome document is set, switching to the first state is always performed to read the image of the document by the color reading unit, and read the mark of the background member at the time of passage of the document by the monochrome reading unit. Accordingly, it is possible to cope with both cases even where the image of the document is color or monochrome.

According to the preferred embodiment, the present invention can be applied to not only a case where the monochrome reading unit is constituted by the light receiving units of one line or more, but also the reading device constituted by the light receiving units of two or more lines.

According to the preferred embodiment, even when the document is a thin sheet, and even if the mark of the background member is black or the like, there is no problem of the image quality such as an occurrence of ground fog, deterioration of set-off, or blackening of a margin caused when there is a punch hole or an ear fold in the document or the size is irregular. Therefore, a high image quality can be achieved. Moreover, there is no configuration in which the reading image on the back side of the document is set to be equal to or higher than the upper limit value (a saturation value), by causing the regular reflected light of the illumination light to be incident on the reading unit. Accordingly, there is no need to strictly maintain and manage the installation precision of the background plate (mirror), which does not cause an increase in cost. As a result, it is possible to provide an image processing device equipped with the document reading device which can achieve the inclination detection at low cost, without affecting the image quality.

According to the preferred embodiment, even when the document is a thin sheet, and even if the mark of the background member is black or the like, there is no problem of the image quality such as an occurrence of ground fog, deterioration of set-off, or blackening of a margin caused when there is a punch hole or an ear fold in the document or the size is irregular. Therefore, a high image quality can be achieved. Moreover, there is no configuration in which the reading image on the back side of the document is set to be equal to or higher than the upper limit value (a saturation value), by causing the regular reflected light of the illumination light to be incident on the reading unit. Accordingly, there is no increase in cost to strictly maintain and manage the installation precision of the background plate (mirror). As a result, it is possible to achieve the inclination detection at low cost which does not affect the image quality.

According to the preferred embodiment, the first state and the second state may be switched, by moving the color reading unit and the monochrome reading unit to different positions with respect to the background member at the time of the color mode and at the time of the monochrome mode.

According to the preferred embodiment, the first state and the second state may be switched, by moving the background member to different positions with respect to the color reading unit and the monochrome reading unit at the time of the color mode and at the time of the monochrome mode.

According to the preferred embodiment, the configuration of the reading device is simplified as compared to a case where the color reading unit is disposed on the upstream side of the monochrome reading unit in the document conveyance direction to read the image of the document or the mark of the background member.

According to the preferred embodiment, by delaying the monochrome image data output from the monochrome reading unit by the delay memory at the time of the monochrome mode until the inclination of the document is detected, it is also possible to detect the inclination of the monochrome image data which is output until the inclination is detected.

According to the preferred embodiment, when the automatic discrimination mode of discriminating whether the document is a color document or a monochrome document is set, switching to the first state may be always performed to read the image of the document by the color reading unit, and to read the mark of the background member at the time of passage of the document by the monochrome reading unit. Accordingly, it is possible to cope with both cases where the image of the document is color or monochrome.

The present invention can be applied to not only a case where the monochrome reading unit is constituted by the light receiving units of one line or more, but also the reading device constituted by the light receiving units of two or more lines.

The present invention can be applied to a program to allow a computer of the document reading device to execute the conveyed document reading method according to the preferred embodiment.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A document reading device comprising:
a hardware processor;
a conveying roller that conveys a document;
a background member that is provided in a direction traversing a conveyance direction of the document and has a mark for correcting an inclination of the document;
a color reader that reads an image of the document conveyed by the conveying roller and outputs color image data to the hardware processor; and
a monochrome reader that reads the image of the document conveyed by the conveying roller and outputs monochrome image data to the hardware processor, wherein
the hardware processor:
switches a state of the document reading device into a first state in which the image of the document can be read by the color reader and the mark of the background member can be read by the monochrome reader at a time of a color mode to read the image of the document by the color reader and read the mark of the background member at a time of passage of the document by the monochrome reader, and switches the state of the document reading device into a second state in which the image of the document can be read by the monochrome reader and the mark of the background member can be read by the color reader at a time of a monochrome mode to read the image of the document by the monochrome reader and read the mark of the background member at the time of passage of the document by the color reader;
detects the inclination of the document based on a reading result of the mark of the background member at the time of passage of the document by the color reader or the monochrome reader; and
corrects the inclination of the color image data output from the color reader at the time of the color mode, and corrects the inclination of the monochrome image data output from the monochrome reader at the time of the monochrome mode, in accordance with the detected inclination of the document.

2. The document reading device according to claim 1, wherein the hardware processor switches between the first state and the second state, by moving the color reader and the monochrome reader to different positions with respect to the background member, at the time of the color mode and at the time of the monochrome mode.

3. The document reading device according to claim 1, wherein the hardware processor switches between the first state and the second state, by moving the background member to different positions with respect to the color reader and the monochrome reader, at the time of the color mode and at the time of the monochrome mode.

4. The document reading device according to claim 1, wherein the monochrome reader is disposed on an upstream side of the color reader in a document conveyance direction.

5. The document reading device according to claim 4, further comprising:
a delay memory that delays monochrome image data output from the monochrome reader, until the inclination of the document is detected by the hardware processor, at the time of the monochrome mode.

6. The document reading device according to claim 1, wherein
the hardware processor sets an automatic discrimination mode of discriminating whether a document is a color document or a monochrome document,
wherein, when the automatic discrimination mode is set, the hardware processor switches to the first state, and reads the image of the document using the color reader and reads the mark of the background member at the time of passage of the document using the monochrome reader.

7. The document reading device according to claim 1, wherein the monochrome reader is constituted by a light receiving sensor of one line or more.

8. An image processing device comprising the document reading device according to claim 1.

9. A document reading method executed in a document reading device comprising: a hardware processor; a conveying roller that conveys a document; a background member that is provided in a direction traversing a document conveyance direction and has a mark for correcting an inclination of the document; a color reader that reads an image of the document conveyed by the conveying roller and outputs color image data to the hardware processor; and a monochrome reader that reads the image of the document conveyed by the conveying roller and outputs monochrome image data to the hardware processor, the method comprising:
switching, by the hardware processor, a state of the document reading device into a first state in which the image of the document can be read by the color reader and the mark of the background member can be read by the monochrome reader at a time of a color mode to read the image of the document by the color reader and read the mark of the background member at a time of passage of the document by the monochrome reader, and switching, by the hardware processor, the state of the document reading device into a second state in which the image of the document can be read by the monochrome reader and the mark of the background member can be read by the color reader at a time of a monochrome mode to read the image of the document by the monochrome reader and the mark of the background member at the time of passage of the document by the color reader;
detecting, by the hardware processor, the inclination of the document based on a reading result of the mark of the background member at the time of passage of the document by the color reader or the monochrome reader; and
correcting, by the hardware processor, the inclination of the color image data output from the color reader at the time of the color mode, and correcting the inclination of the monochrome image data output from the monochrome reader at the time of the monochrome mode, in accordance with the inclination of the document detected by the detecting.

10. A non-transitory recording medium storing a computer readable document reading program for causing a computer of a document reading device to execute the document reading method according to claim 9.

11. The non-transitory recording medium storing a computer readable document reading program according to claim 10, wherein the first state and the second state are switched, by moving the color reader and the monochrome reader to different positions with respect to the background member, at the time of the color mode and at the time of the monochrome mode.

12. The non-transitory recording medium storing a computer readable document reading program according to claim 10, wherein the first state and the second state are switched, by moving the background member to different positions with respect to the color reader and the monochrome reader, at the time of the color mode and at the time of the monochrome mode.

13. The non-transitory recording medium storing a computer readable document reading program according to claim 10, wherein the monochrome reader reads the image of the document or the mark of the background member on an upstream side of the color reader in the document conveyance direction.

14. The non-transitory recording medium storing a computer readable document reading program according to claim 13, wherein, at the time of the monochrome mode, the monochrome image data output from the monochrome reader is delayed by a delay memory, until an inclination of the document is detected by the detecting.

15. The non-transitory recording medium storing a computer readable document reading program according to claim 10, further comprising:
setting, by the hardware processor, an automatic discrimination mode which discriminates whether the document is a color document or a monochrome document,
wherein, when the automatic discrimination mode is set, the switching into the first state is performed, and the image of the document is read by the color reader and the mark of the background member at the time of passage of the document is read by the monochrome reader.

16. The non-transitory recording medium storing a computer readable document reading program according to claim 10, wherein the monochrome reader includes light receiving sensors of one line or more.

* * * * *